United States Patent [19]
Lebovitz

[11] 3,771,412
[45] Nov. 13, 1973

[54] MISSILE LAUNCHER
[75] Inventor: Bernard Lebovitz, Hazelwood, Mo.
[73] Assignee: The United States of America as represented by the Secretary of the Air Force, Washington, D.C.
[22] Filed: Apr. 18, 1972
[21] Appl. No.: 245,061

[52] U.S. Cl............. 89/1.807, 89/1.5 R, 89/1.812, 89/1.814
[51] Int. Cl............................................. F41f 3/04
[58] Field of Search............... 89/1.5, 1.811, 1.812, 89/1.803, 1.814, 1.819, 102.23

[56] References Cited
UNITED STATES PATENTS

| | | | |
|---|---|---|---|
| 2,826,120 | 3/1958 | Lang et al. | 89/1.5 R X |
| 3,327,629 | 6/1967 | Judd | 102/23 |
| 3,242,808 | 3/1966 | Nelson | 89/1.5 R |
| 3,444,779 | 5/1969 | Buell et al. | 89/1.811 |
| 3,266,834 | 8/1966 | Lebovitz | 89/1.5 R X |
| 3,670,654 | 6/1972 | Billot | 89/1.5 D |

Primary Examiner—Samuel W. Engle
Attorney—Harry A. Herbert, Jr. et al.

[57] ABSTRACT

A missile launcher incorporating therein a novel locking arrangement, ejector means, firing system, energizing means and stray energy monitors. This series of elements function as a new combination providing a more reliable apparatus for securing a missile to an aircraft and, which is capable of, at a predetermined time thereafter, releasing the missile.

7 Claims, 14 Drawing Figures

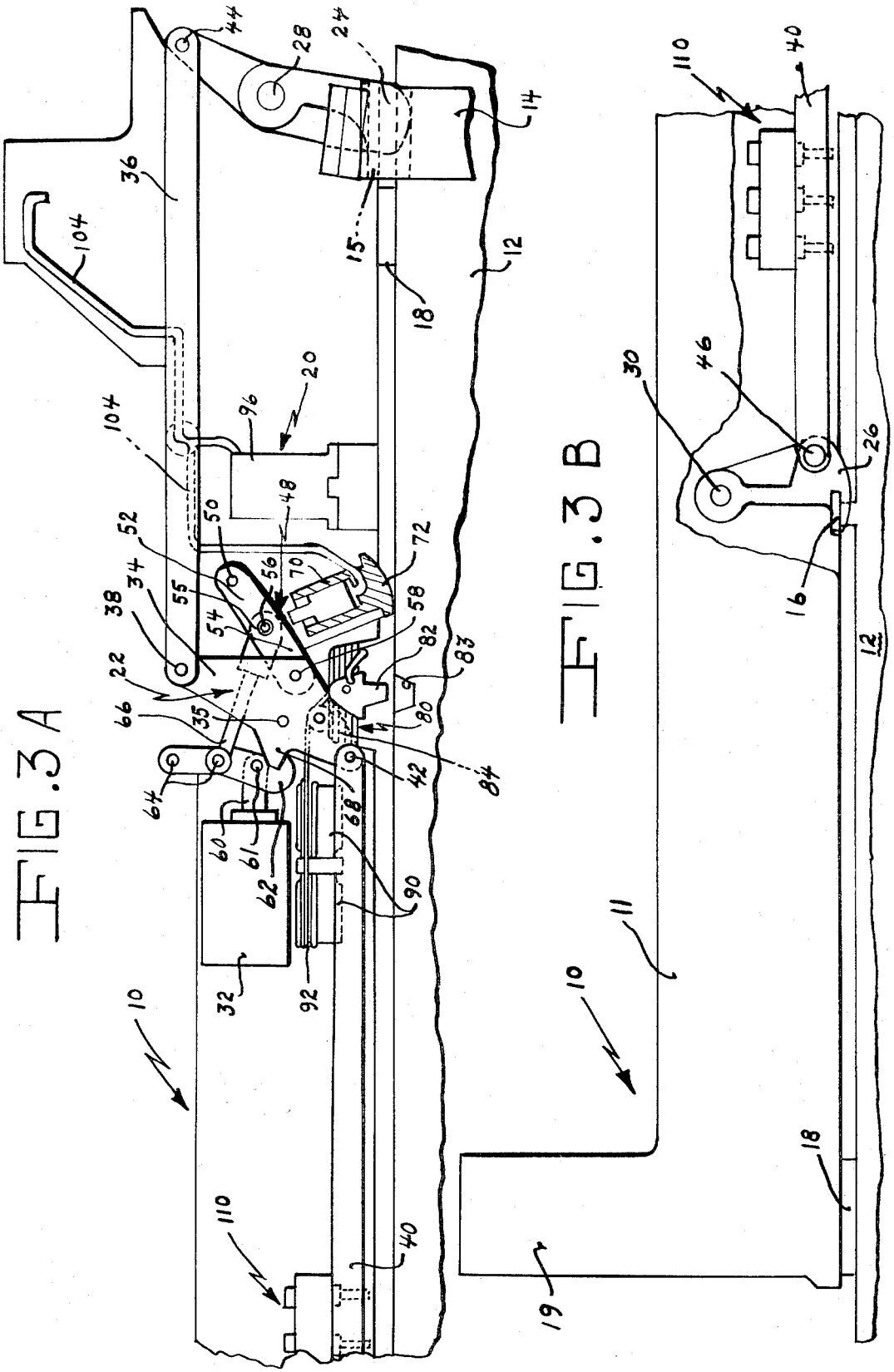

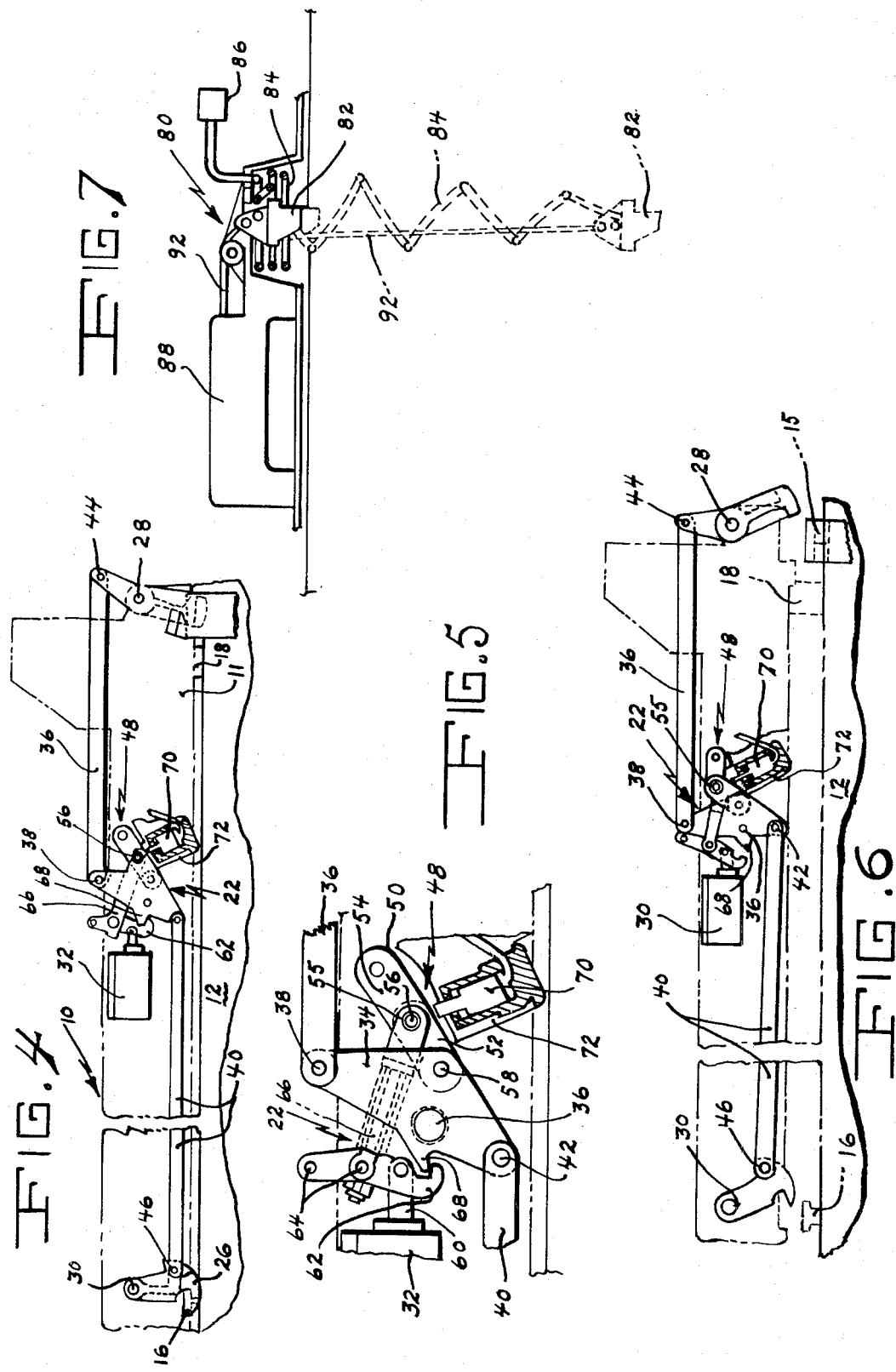

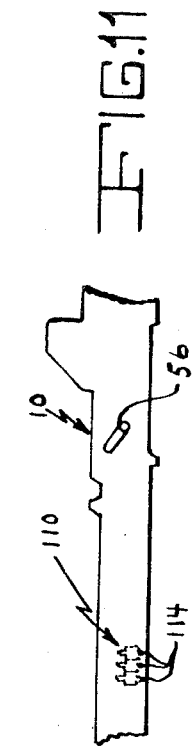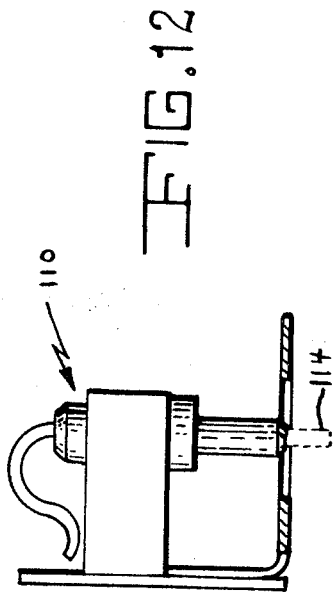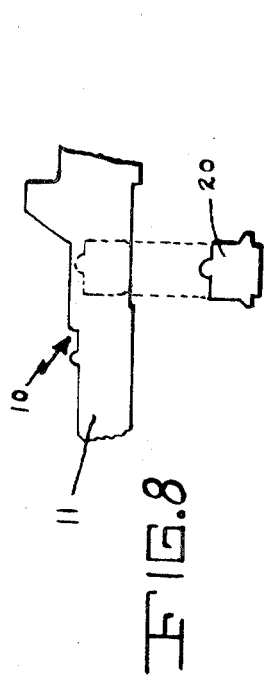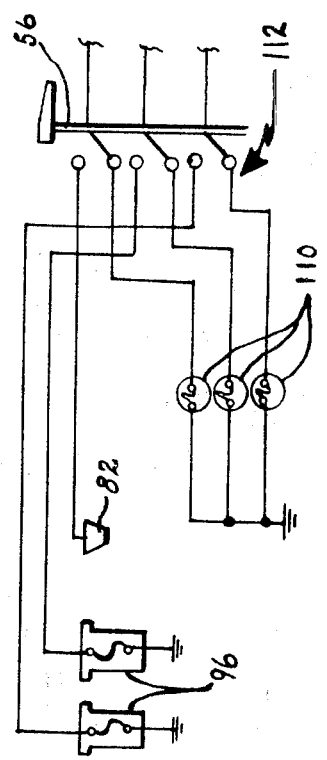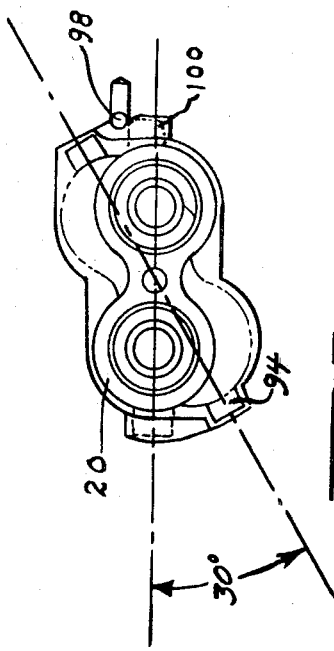

MISSILE LAUNCHER

BACKGROUND OF THE INVENTION

This invention relates generally to missile launchers, and, more particularly, to a missile launcher which releasably supports the missile under the body of an aircraft.

Various devices have been employed for carrying rockets and missiles under an aircraft. The missiles have been securely attached to the aircraft during take-off and flight with the launcher equipped to release the missile upon firing thereof. A conventional method of mounting missiles heretofore employed has been to support the missile in a U-shaped hanger and to hold the missile by spring or other restraining means. Considerable difficulty has been incurred in such an arrangement to prevent dislodging of the missile from the aircraft when concentrated deceleration forces are imparted to the aircraft.

Another method imposed in the past to restrain the missile has been the use of retaining pawls to resist forward motion of the missile and to hold the pawl by a shear-pin of particular strength. The shear-pin is designed to hold the missile in place under the concentrated deceleration forces imparted to the aircraft in the course of an arrested landing upon the flight deck of an aircraft carrier, for example, and yet not sufficiently large to prevent the firing of the rocket projectile. Furthermore, launchers of the past were essentially unreliable when they incorporated specific firing systems and stray energy monitors in the system.

SUMMARY OF THE INVENTION

The instant invention sets forth a missile launcher which overcomes the deficiencies set forth hereinabove. The launcher of this invention is lighter in weight, more reliable, simpler in mechanical operation and easier to maintain than the launchers of the past.

The instant invention sets forth a missile launcher which is secured beneath any conventional aircraft. The launcher is of the ejector type which is powered by two electrically initiated conventional cartridges. A pair of twin telescoping pistons are utilized in conjunction with the cartridges in order to eject the missile at approximately twenty feet per second during the firing operation. The energizing means for the launcher is a gas system in the form of cartridges mounted within the launcher in a quick disconnect breech which enables the aircraft to be rearmed more quickly. The breech houses the two cartridges with the electrical firing pins located in the cartridge retainers. The breech is inserted within the launcher and a 30° locking turn fixedly secures the breech and cartridges in place.

The linkage mechanism in the launcher of this invention is designed to carry the missile throughout the aircraft flight. Launch hooks attach to existing missile lugs and secure the missile securely to the launcher. The hooks once locked remain positively locked until the missile is armed or down loaded. This positive lock is accomplished by a solenoid actuated bell crank that locks the hook release. At the time of arming, the energized solenoid unlocks the hook linkage, ready for launch.

A specially designed motor control for the missile is in the form of an umbilical type plug which is capable of energizing the missile and after launch quickly disconnecting from the missile and returning to its operative position within the launcher. To insure a quick and safe load of cartridges and missiles, a stray energy detecting system is also incorporated in the missile launcher of this invention.

It is therefore an object of this invention to provide a missile launcher which reliably secures a missile in place and is capable of releasing the missile at a predetermined time.

It is a further object of this invention to provide a missile launcher which incorporates therein a preloaded cartridge breech capable of easy installation and removal.

It is another object of this invention to provide a missile launcher which utilizes a reel-type energizing plug within the launcher.

It is still another object of this invention to provide a missile launcher containing stray energy monitors.

It is still another object of this invention to provide a missile launcher which is economical to produce and which utilizes conventional, currently available components that lend themselves to standard producing manufacturing techniques.

For a better understanding of the present invention together with other further objects thereof, reference is made to the following description taken in connection with the accompanying drawing and its scope will be pointed out in the appended claims.

DESCRIPTION OF THE DRAWING

FIG. 3a is a partially cut away side elevational view of the forward half of the missile launcher of this invention, shown partly in cross section;

FIG. 3b is a partially cut away side elevational view of the rear half of the missile launcher of this invention, shown partly in cross section;

FIG. 4 is a side elevational view of a portion of the missile launcher of this invention showing the linkage mechanism and launcher hooks in the locked position;

FIG. 5 is a side elevational view of the linkage mechanism of the missile launcher of this invention;

FIG. 6 is a side elevational view of a portion of the missile launcher of this invention showing the linkage mechanism and launcher hooks thereof in the unlocked position;

FIG. 7 is a side elevational view of the missile motor plug return assembly of the missile launcher of this invention, with phantom lines showing the plug in the extended position;

FIG. 8 is a side elevational view of a portion of the missile launcher of this invention showing the location of the quick disconnect breech;

FIG. 9 is a side elevational view of the cartridges within the breech of the missile launcher of this invention;

FIG. 10 is a bottom view of the quick disconnect breech of the missile launcher of this invention;

FIG. 11 is a side elevational view of a portion of the missile launcher of this invention showing the location of the stray energy monitors;

FIG. 12 is a side elevational view of a stray energy monitor of the missile launcher of this invention; and FIG. 13 is a schematic diagram of the circuitry of the stray energy monitors of the missile launcher of this invention.

DETAILED DESCRIPTION OF THE PREFERRED EMBODIMENT

Figure 1:
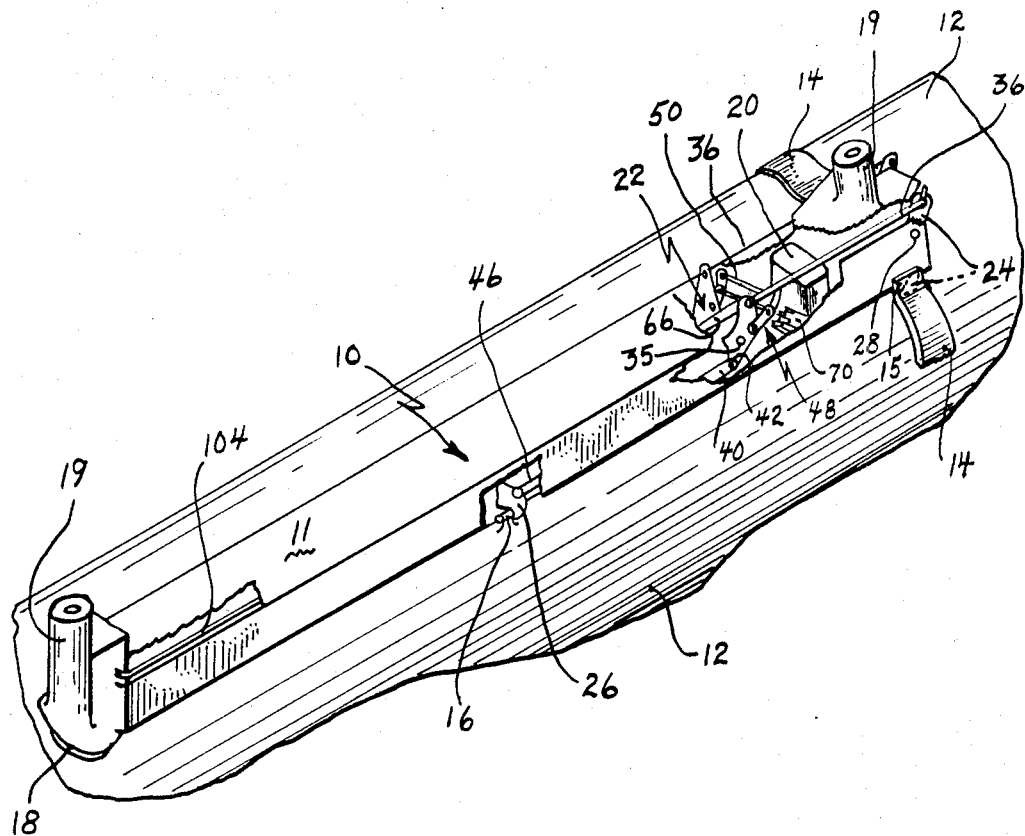
FIG. 1 is a pictorial view of the missile launcher of this invention illustrating the location of the various elements thereof.
Figure 2:
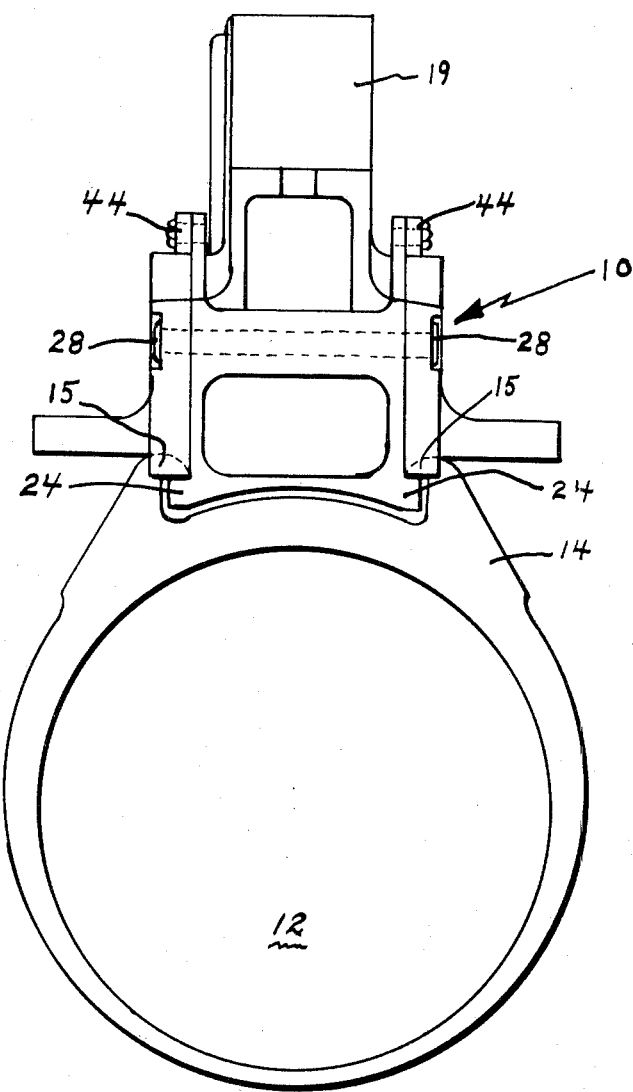
FIG. 2 is a front view of the missile launcher of this invention with the missile held securely in place.

Reference is now made to FIG. 1 of the drawing which discloses in pictorial fashion the missile launcher 10 of this invention supporting securely in position a conventional missile 12. The missile 12 has a yoke 14 with lug 15 attached thereto (FIG. 2) at one end thereof and launcher lugs 16 at the other end thereof. Launcher 10 is made up of a launcher body 11 which incorporates therein a linkage mechanism 22 to operate at least one pair of launcher hooks 24 and 26, in a manner to be described in detail hereinbelow, for engaging lugs 15 and 16, thereby holding missile 12 securely in place as shown in FIGS. 1 and 2. Still referring to FIG. 1 of the drawing the launcher body 11 has a pair of twin telescoping pistons 18 located within housings 19 at either end thereof utilized in ejecting the missile 12 during the firing operation. A gas system supplies the energy source for actuating these pistons 18 and is in the form of conventional electrically initiated cartridges located within a quick disconnect breech 20 in the forward part of launcher 10.

Reference is now made to FIGS. 2, 3a and b, and FIG. 4 of the drawing which show the linkage mechanism 22 utilized to operate hooks 24 and 26. FIGS. 3a, 3b and 4 show that linkage mechanism 22 is operably connected to the pair of launcher hooks 24 and 26 which are pivotally mounted to body 11 by pins 28 and 30, respectively. For additional support of missile 12 hooks 24 and 26 may be formed in duplicate also supported by pins 28 and 30 and operated by linkage mechanism 22 in the manner shown in FIGS. 1 and 2. For simplicity, however, in the description of the launcher 10 this invention reference will be made to only one set of hooks 24 and 26 with any further number of hooks to be mounted in an identical manner.

Referring to FIGS. 3a and 5, a safety solenoid 32 allows for the release of linkage mechanism 22 of launcher 10 in a manner described below. The linkage mechanism 22 has a bellcrank 34 pivotally mounted on pin 35 within launcher body 11. Bellcrank 34 has attached thereto at one end an elongated link 36 pivotally secured thereto at 38 and at the other end elongated link 40 pivotally secured thereto at 42. Links 36 and 40 are then secured to hooks 24 and 26, respectively, by pins 44 and 46 as shown in FIGS. 3a, 3b and 4 of the drawing.

A two bar linkage 48, made up of bars 52 and 54, shown in FIGS. 3a and 5 is pivotally secured to body 11 by pin 50, and to bellcrank 34 by pin 58, with the bars 52 and 54 joined together at 55 by any suitable securing means. In the locked position shown in FIG. 4 a safety pin 56 fixedly attaches two bar linkage 48 to body 11 and thereby prevents movement of mechanism 22. Referring once again to FIGS. 3a and 5 solenoid 32 has an actuator 60 connected thereto. Actuator 60 has pivotally secured at one end thereof at 61 a hook shaped element 62. Element 62 is further pivotally secured within launcher body 11 by pin 64, and, is operably secured to the joining point 55 of two bar linkage 48 by element 66. The hook shaped element 62 engages an outstanding element 68 on bellcrank 34 during the locked position of launcher 10 shown in FIGS. 3a and 4.

A slave piston 70 (FIGS. 3a and 5) is mounted within a housing 72 in a conventional manner and is located adjacent the joining point 55 of two bar linkage 48. This piston 70 receives its actuating force from the gas released from the cartridges within breech 20 by a system to be explained in detail hereinbelow.

Reference is now made to FIGS. 4, 5 and 6 which show the linkage mechanism 22 operated from the locked position of FIG. 4 to the unlocked position of FIG. 6. Upon the removal of safety pin 56 and upon the energizing of solenoid 32, hook element 62 is withdrawn to the position shown in FIG. 6. Simultaneously with the above action piston 70 moves against the joining point 55 of two bar linkage 48 causing the movement of two bar linkage 48 to the position shown in FIG. 6. This action produces movement of bellcrank 34 about pivot point 36 which then retracts elongated links 36 and 40 causing the pivotal movement of hooks 24 and 26 respectively, thereby releasing the missile 12 for operation thereof, further assisted by the action of pistons 18.

The firing system 80 for missile 12 incorporated within launcher 10 of this invention is best shown in FIGS. 3a and 7 of the drawing. This system 80 utilizes a missile motor plug 82 electrically connected by a coiled wire 84 and launcher plug 86 to any conventional firing source (not shown). Plug 82 is shown in its retracted position in FIGS. 3a and 7 and, in its extended position in phantom in FIG. 7. During operation plug 82 is inserted within plug insert 83 of missile 12 (FIG. 3a) while missile 12 is supported by launcher 10. A spring reel housing 88 (FIG. 7) encloses a pair of spring loaded pulleys 90 (FIG. 3a). A cable 92 is secured at one end to pulleys 90 and at the other to plug 82. Upon the release of missile 12, plug 82 extends beyond the missile launcher 10 as shown in FIG. 7 allowing the firing of missile 12 to take place. Upon further ejection of missile 12 by pistons 18, plug 82 then disengages from missile 12 and returns to launcher 10 to its retracted position as shown in both FIGS. 3a and 7.

Supplying the gas source for the operation of the linkage mechanism 22 as well as the pistons 18 is a pair of conventional gas cartridges 96 located within a quick disconnect breech 20 shown in FIGS. 1, 3a, and 8 through 10. Quick disconnect breech 20 enables the aircraft utilizing launcher 10 of this invention to be rearmed more quickly. The breech 20 houses the pair of cartridges 96 as shown in FIG. 9 with an electrical firing plug 98 located in the cartridge retainers. Insertion of the breech 20 within the launcher body 11 is shown in exaggerated fashion in FIG. 8 of the drawing and a 30° locking turn as shown in FIG. 10 installs the breech 20 within the body 11. This breech 20 is held securely in place by any conventional securing means such as a ball detent 98 which abuts lug 100 on breech 20 as shown in FIG. 10.

FIGS. 1, 3a, and 9 more clearly show gas ports 102 and lines 104 which are utilized to supply the gas from cartridges 96 to piston 70 for actuating linkage mechanism 22 as well as piston 18 for ejection of missile 10. Complete detail of the gas system is not shown since any conventional use of valves, lines and the like may be used with the quick disconnect breech arrangement 20 of this invention.

To insure a quick and safe loading of cartridges 96 and missile 12, a conventional stray energy detecting system or monitors 110 shown in FIGS. 3a and 11 through 13 has been incorporated in the missile launcher firing circuits. The stray energy monitors 110 are switched into and out of operation by the circuitry 112 shown in FIG. 13 which depends upon safety pin 56 shown in both FIGS. 3a, 11 and 13 for its operation. Insertion of pin 56 not only locks two bar linkage 48 securely in position in order to prevent inadvertent actuation of the linkage mechanism 22 (FIG. 3a) but also allows stray energy monitors 110 to act upon the detection of any stray energy in the circuits. Any stray energy causes the actuation of pins 114 within any one of a plurality of the stray energy monitors 110. Pins 114 protrude into view (as shown in FIG. 12) so any personnel by sight or touch inspection can determine whether the aircraft and/or launcher should be set aside for further testing in order to isolate the source of the stray energy. If no stray energy is detected, removal of safety pin 56 places linkage mechanism 22 in readiness for operation and as seen from FIG. 13 transfers the firing circuits back to the normal operation.

MODE OF OPERATION

The missile launcher 10 of this invention operates in the following manner:

The quick disconnect breech 20 and safety pin 56 are inserted into the launcher body 11. The missile 12 as shown in FIG. 1 of the drawing is locked into position beneath launcher 10 by means of a plurality of launcher hooks 24 and 26 and the positive lock of linkage mechanism 22. Before take-off of the aircraft associated with the launcher 10 of this invention, inspectors check the stray energy monitors 110 for any source of stray energy. If the check is satisfactory, safety pin 56 is withdrawn from two bar linkage 48 and the missile launcher 10 is ready for the release and firing of missile 12.

At a predetermined time the solenoid 32 is energized unlocking the linkage mechanism 22. When the missile 12 is to be launched, actuation of cartridges 96 in any conventional manner such as by electrical plug 98 produces a gas which forces piston 70 into the position shown in FIG. 6 of the drawing causing the inward movement of two bar linkage 48 and the release of hooks 24 and 26 from lugs 15 and 16. The missile 12 is thereby released from its position beneath launcher 10 and under the action of pistons 18 is expelled from beneath the aircraft. Missile 12 is fired in any conventional manner through the use of the missile motor plug 82. With missile 12 a predetermined distance from launcher 10, plug 82 will disconnect from missile 12 and return to its original position as shown in FIG. 7. The missile 12 now operates under its own power.

The launcher 10 of this invention has eliminated any unnecessary time consuming methods and procedures found in the prior art. For example, no longer will the ground crew have to remove both cartridge retainers in order to reload the launcher 10 since this operation is now accomplished with a preloaded breech 20 that is installed and locked with a simple 30° twist. No longer will it be necessary to use circuit testers to analyze the firing circuit for stray voltage; now the stray energy monitors 110 will advise the inspectors at a glance. Furthermore, the hooks which heretofore were manually latched to the missile lugs are now closed and safety locked ready for release by linkage mechanism 22. Also plug 82 is readily returned to the launcher 10 by means of the motor plug return assembly 80.

Although this invention has been described with reference to a particular embodiment it will be understood to those skilled in the art that this invention is also capable of a variety of alternate embodiments within the spirit and scope of the appended claims.

I claim:

1. A missile launcher comprising an elongated body, means mounted within said launcher body for releasably securing a missile thereto, a linkage mechanism operably associated with said missile securing means for positively locking and unlocking said missile securing means, means retractably secured within said launcher body for firing said missile, means located within said launcher body for detecting stray energy, ejector means located within said launcher body for ejecting said missile, energizing means releasably secured within said launcher body for actuating said linkage mechanism and said ejector means, said energizing means comprising a plurality of gas cartridges, said cartridges being located within a quick disconnect breech, said breech being mounted within an opening in said launcher body, and a locking means located adjacent said opening whereby a 30° locking turn of said breech securely holds said breech in position, and a solenoid operably connected to said linkage mechanism, in one position said solenoid prevents movement of said linkage mechanism while in a second position allows said linkage mechanism to move under the influence of said energizing means, whereby upon the failure to detect stray energy and at a predetermined time, said missile securing means releases said missile, said missile is fired and said missile is ejected under the action of said ejector means.

2. A missile launcher as defined in claim 1 wherein said retractable firing means comprises a plug, at least one spring loaded pulley mounted within said launcher body, a cable secured at one end thereof to said pulley and at the other end thereof to said plug, whereby said plug initially engages said missile, withdraws from said launcher body upon ejection of said missile, disengages from said missile at a predetermined distance from said launcher, and subsequently retracts into said launcher body.

3. A missile launcher as defined in claim 1 wherein said missile securing means comprises at least one pair of hooks pivotally mounted within said launcher body, each of said hooks being connected to said linkage mechanism by an elongated link, whereby movement of said linkage mechanism causes movement of said hooks to the locked or unlocked position.

4. A missile launcher as defined in claim 3 wherein said linkage mechanism comprises a bellcrank pivotally mounted within said launcher body, one end of said bellcrank being connected to one of said elongated links, the other end of said bellcrank being connected to the other of said elongated links, a two bar linkage having one link thereof pivotally secured to said launcher body while the other link thereof is pivotally secured to said bellcrank, an actuator located adjacent the joining point of said two bar linkage, and said actuator being operably connected to said energizing means whereby said actuator upon actuation by said energizing means moves said two bar linkage, the movement of said two bar linkage causing a pivotal movement of said bellcrank, which in turn retracts said elongated links causing unlocking of said hooks.

5. A missile launcher as defined in claim 4 wherein said retractable firing means comprises a plug, a spring reel housing located within said launcher body, at least one spring loaded pulley within said housing, and a cable secured at one end thereof to said pulley and at the other end thereof to said plug, whereby said plug initially engages said missile, withdraws from said launcher body upon ejection of said missile, disengages from said missile at a predetermined distance from said launcher and subsequently retracts into said launcher body.

6. A missile launcher as defined in claim 5 wherein said ejector means comprises at least one gas operated piston.

7. A missile launcher as defined in claim 9 further comprising a safety pin operably connected to the joining point of said two bars of said two bar linkage and said stray energy detector, whereby with said safety pin in position said two bar linkage is prevented from moving and said stray energy detector is operable, while extraction of said safety pin allows movement of said two bar linkage and disconnection of said stray energy detector.

* * * * *